(12) United States Patent
Heine et al.

(10) Patent No.: US 6,524,478 B1
(45) Date of Patent: Feb. 25, 2003

(54) APPARATUS FOR FILTERING AND SEPARATING PARTICULARLY BIOLOGICALLY ORGANIC FLUIDS

(75) Inventors: Wilhelm Heine, Hamburg (DE); Ralph Günther, Buchholz (DE)

(73) Assignee: Rochem Ultrafiltrations Systeme Gesellschaft für Abwasserreinigung mbH, Hamburg (DE)

( * ) Notice: Subject to any disclaimer, the term of this patent is extended or adjusted under 35 U.S.C. 154(b) by 0 days.

(21) Appl. No.: 09/597,118

(22) Filed: Jun. 20, 2000

(30) Foreign Application Priority Data

Apr. 20, 2000 (EP) .............................................. 00108634

(51) Int. Cl.⁷ ............................................... B01D 63/00
(52) U.S. Cl. ............. 210/321.75; 210/232; 210/321.84; 210/416.1; 210/483; 210/488; 210/489
(58) Field of Search .............................. 210/321.6, 232, 210/321.72, 321.75, 321.84, 416.1, 483, 488, 489, 496, 498

(56) References Cited

U.S. PATENT DOCUMENTS 4,187,086 A * 2/1980 Walmet et al.
5,174,900 A * 12/1992 Nichols et al. ........ 210/321.79
5,620,605 A * 4/1997 Moller ........................ 210/650
5,626,752 A * 5/1997 Mohn et al. ........... 210/321.75
5,928,409 A * 7/1999 Sirkar ........................... 95/45

FOREIGN PATENT DOCUMENTS

DE           3441249 A1 *  5/1985

* cited by examiner

Primary Examiner—John Kim
(74) Attorney, Agent, or Firm—Klaus J. Bach

(57) ABSTRACT

In an apparatus for filtering and separating fluids by reverse osmosis or by micro-, ultra-, and nano filtration, including a plurality of spaced planar filter elements arranged in stacks in spaced relationship so that their surfaces can be contacted by the fluids for the collection of permeate from the fluids within the filter elements, at least one draining rod having a central draining passage extends through the stack of filter elements and has openings disposed in each filter element for collecting the permeate from the respective filter elements, and a vacuum generating means is connected to a permeate discharge which is in communication with the draining rod passages for generating a vacuum in each filter element.

14 Claims, 3 Drawing Sheets

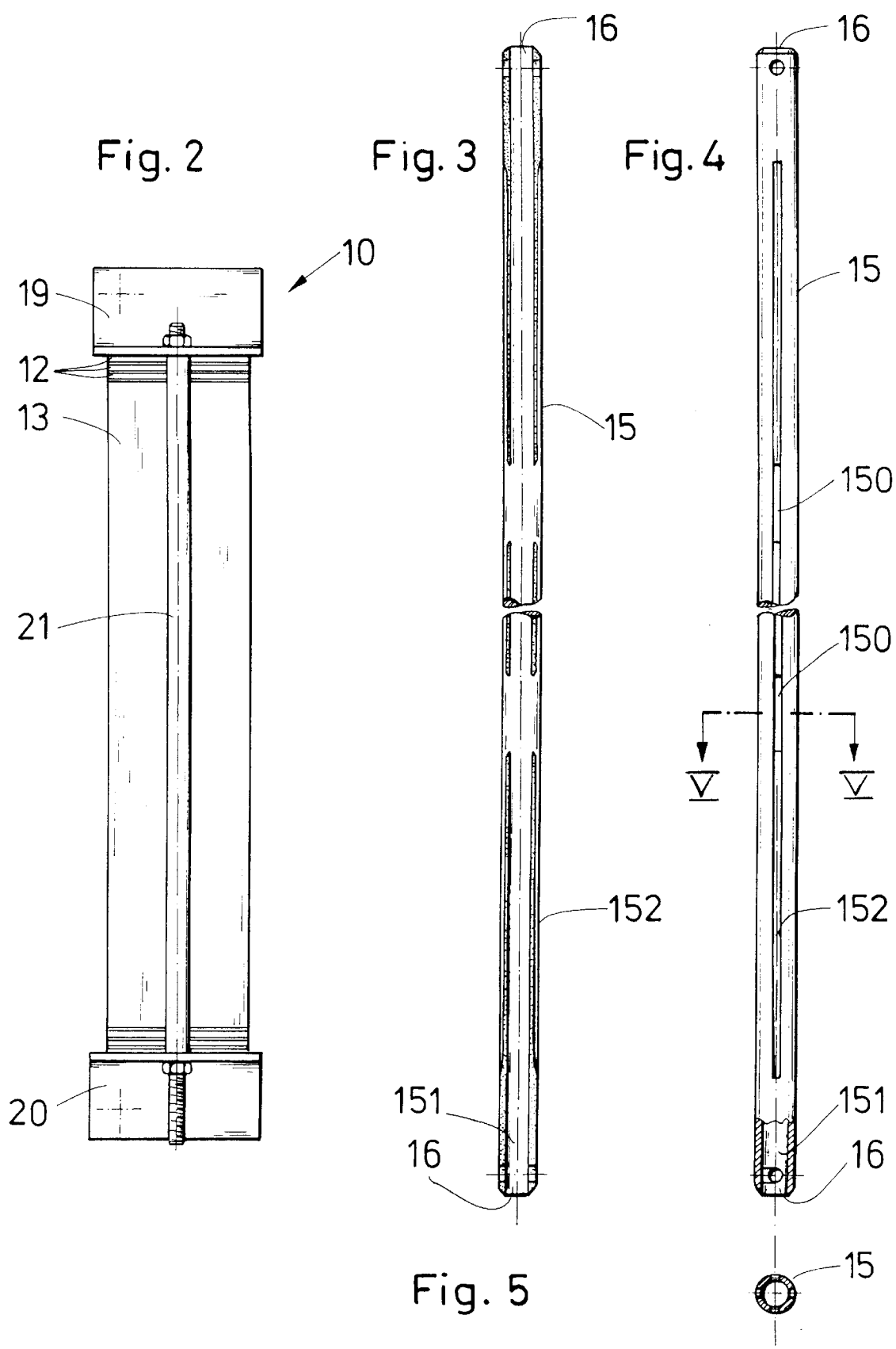

APPARATUS FOR FILTERING AND SEPARATING PARTICULARLY BIOLOGICALLY ORGANIC FLUIDS

BACKGROUND OF THE INVENTION

The invention relates to an apparatus for filtering and separating particularly biologically organic fluids by reverse osmosis and by micro-, ultra-, and nano- filtration. The apparatus comprises a plurality of spaced filter elements with large surface areas which are in contact with a fluid and which include a plurality of separate stacks of filter elements arranged adjacent one another in such a way that the fluid flows through the stacks in series or in a parallel flow relationship. The permeate collected by the filter elements enters draining bolts extending through the stacks of filter elements and is conducted out of the apparatus through permeate discharge conduits.

Such an apparatus is known for example from EP-A-0 707 884. The apparatus disclosed therein includes a housing in which the stacks of filter elements are arranged in series. The housing includes an inlet for the fluids to be separated, an outlet for the retentate and an outlet for the permeate, which is collected by the filter elements and discharged by way of the permeate outlet for further utilization. Within the housing, in which the stacks are arranged, there is provided an essentially open channel for the fluid flow. The particular arrangement of the stacks of filter elements permits very high flow speeds of the fluid between the inlet for the fluid entering the apparatus and the outlet for the fluid leaving the apparatus as retentate. As a result, the formation of deposits for example in the form of filter cakes on the filter elements is prevented since the stacks of filter elements have essentially no areas which are not subject to the fast fluid flow. The fluid can flow from the inlet to the outlet of the apparatus in a straight flow path without any deflections.

Communal as well as commercial waste waters have generally a high content of biologically organic compounds. Such waste waters are said to have a high bio-mass concentration, which can be controlled only by large apparatus and/or procedural expenses if the liquid solvent, generally water, is to be removed from such fluids including biologically organic compounds. The collection of the aqueous solvents may have the purpose of concentrating the fluid so that it can be decomposed in an optimal way and/or the collection of the aqueous medium from the fluid, for the production of useable water and even drinking water from the fluids including the biologically organic compounds.

Such apparatus must be functional even when the fluid is almost stagnant that is even if the fluid moves only at very low speed. The fluid may be in such a state for example in wastewater settling tanks or in open bodies of water, but also in bio-reactors. In those cases, the high flow speeds of the fluid as they exist between the fluid inlet and the outlet for the retentate of the prior art apparatus, which provides for a continuous problem-free operation of the apparatus, are not available.

In many cases, the energy requirements for a continuous undisturbed operation of such an apparatus should also be very low as such apparatus should be operable independently of existing power supply nets.

In that case, high fluid pressures and fluid flow speeds as they are generated in the prior art apparatus by electric circulating pumps cannot be provided.

It is consequently the object of the present invention to provide an apparatus of the type referred to initially, which is capable of safely separating fluids with a high content of biologically organic and/or inorganic compounds. The apparatus should be capable of performing the separation even at very low fluid flow speeds, or even at stagnation and the build up of deposits forming a filter cake on the filter elements should be avoided as much as possible. The apparatus furthermore should be operable efficiently and continuously with low energy consumption and without the need for servicing.

SUMMARY OF THE INVENTION

In an apparatus for filtering and separating fluids by reverse osmosis or by micro-, ultra-, and nano filtration, including a plurality of spaced planar filter elements arranged in stacks in spaced relationship to permit their surfaces to be contacted by the fluids for the collection of permeate from the fluids within the filter elements, at least one draining rod having a central draining passage extends through the stack of filter elements and has: openings disposed in each filter element for collecting the permeate therefrom and a vacuum generating means is connected to a permeate discharge which is in communication with the draining rod passage for generating a vacuum in each filter element.

The advantage of the invention resides mainly in the fact that the apparatus may simply be immersed—without housing—into the fluid, for example, into a settling tank, a waste water treatment container, an open body of water, or even a bio-reactor. Only a suitable vacuum has to be generated at the permeate discharge for example by a vacuum pump providing a vacuum of 0.5 to 0.9 bar. However, the elimination of a need for a housing for the apparatus is not the only advantage. It is also possible to effect the separation essentially exclusively by the vacuum generated at the permeate side that is by providing the optimum pressure difference between the fluid and the permeate, which is obtained by providing a suitable pressure difference between the fluid flow medium and the permeate. It is furthermore advantageous that the apparatus provides for an extremely large membrane surface area in a relatively small space and no housing parameters need to be taken into consideration. If the membrane surface area of the apparatus turns out to be insufficient to achieve the desired degree of concentration for the retentate or the desired degree of purity of the permeate the membrane surface area can be increased in a simple manner by adding stacks of filter elements to the apparatus. The apparatus should therefore be so designed that such addition is easily possible at any time.

In a preferred embodiment of the apparatus according to the invention, the filter elements are in the form of membrane pillows as they are generally known in the membrane separation field. It is pointed out however, that the membranes do not need to be in the form of membrane pillows. It is also possible to employ filter elements which consist of a single membrane layer if it is made sure by the design that the side of the membrane element opposite to the fluid to be separated is effectively sealed with respect to the fluid flow so that the fluid cannot mix with the permeate.

Each membrane pillow preferably includes a form-stabilizing frame structure forming a support structure and extending adjacent the outer circumference of the filter element. However, the filter elements, be they in the form of single-sided membrane elements or in the form of membrane pillows, could also be stabilized by external means which prevent the membranes from being pressed together into contact with each other during operation of the apparatus.

Without support means, the effective membrane surface area could be limited and the separation performance could be reduced. Furthermore, the selective separation layers of the membrane elements could be damaged and the membrane elements could become attached to one another if the membranes of adjacent elements would come into contact with each other. This would provide locations for the collection of deposits, which could result in a complete blocking of the filter elements. It is also possible that the fluid includes coarse materials or a large amount of solids which, with mechanically unstable filter elements, could also cause the filter elements to come into contact with one another with the same results as mentioned above. It is therefore advantageous to arrange form stabilizing support elements in the membrane pillows, which extend between the outer support frame elements. If only a single-sided membrane structure is used a stabilizing structure may be disposed above or below the single membrane to provide for a filter element with high individual stability. Such an arrangement preferably has no outer spacer elements as they are known from the state of the art so that the fluid can reach any part of a filter element without any restrictions. This is particularly advantageous if the filter element is used for stagnant or slow-moving fluids.

The filter elements themselves consist preferably of a polymer or a polymer mixture. In that case, they are called polymer membranes. Polymer membranes are known for use in connection with various separating tasks with different chemical compositions and are selected depending on the respective separating task.

In addition to filter elements of polymer or polymer mixtures, filter elements of ceramic material may be provided, which are suitable for special separation tasks which cannot be solved by polymer membranes or which are difficult to solve thereby. This is particularly true for separation tasks with fluids at a temperature at which the polymer and polymer mixture membranes are no longer stable.

The stabilization element itself preferably consists of a material, which is sufficiently temperature and pressure resistant such that the filter element, which includes the stabilization element on the inside or on the outside, is not or only slightly deformed.

In order to improve the discharge of the permeate, that is to reduce the energy requirements at the permeate side, the stabilization element consists preferably of a porous material. Then, the permeate may reach the permeate discharge passages of the apparatus with lower energy losses since the porous material facilitates flowing of the permeate from the permeate side of the membrane.

Preferably, the stabilization element consists of a plastic and/or a metallic and/or a ceramic material or a combination of these materials. Of course, the material for the stabilization element is selected depending on its compatibility with the fluid and on the expected temperature conditions.

It has been said earlier that the apparatus is also designed taking into consideration simplicity and design features which can be realized relatively inexpensively thereby providing advantages when the apparatus is utilized in large numbers and the ease of manufacturing and servicing. In this regard, it is advantageous if a plurality of draining rods or bolts are arranged distributed around the circumference of a stack and the draining bolts include openings spaced along the length of the draining bolt for receiving the permeate and conducting it out of the apparatus through an draining passage extending axially through the draining bolt. Such an arrangement permits the use of standard tubes, which are commercially available, for example, tubular materials of plastic or glass fiber reinforced or of metallic materials. In this way, the bolts may be provided with simple discharge grooves extending axially along the draining bolts. These grooves may include spaced radial openings extending to the interior of the tubes whereby, at one hand, the mechanical stability of the draining bolts is preserved and, on the other hand, a uniform permeate discharge capability is provided.

A disc cutter of small diameter can easily form the axial grooves and the openings.

Preferably, the filter elements of a stack are spaced from one another such that the filter elements do not contact one another during operation of the apparatus. The disadvantages such contacting would have, have been described earlier.

Preferably, the spacing between the filter elements is provided by annular spacer elements. This type of spacing is preferably chosen if the filter elements or filter element stacks are penetrated only by a single draining bolt. However, annular spacer elements may be provided also if two draining bolts penetrate a stack for example. But in that case, strip-like spacer elements are preferred which include openings disposed at the distance of the bores for receiving the two bolts, which, in this case, are spaced, with one of the bolts extending through each opening.

Whether the spacer elements are annular or strip-like, they can be so formed that they do not only fulfill a spacing function but also a sealing function with respect to the permeate discharge space. In this way, the number of parts required for forming a stack of filter elements can be reduced.

The stacks of filter elements may be held together by straps arranged at opposite sides of the stack in spaced relationship. Preferably, spacers are disposed between the straps, which interconnect the straps and hold them at a predetermined distance from each other. In this way, a uniform axial pressure is applied to the stacks of filter elements, whereby the stacks with the spacer elements and possible separate seals are pressure sealed.

The design described above for the support and pressure seal arrangement for the filter elements or respectively, the stack of filter elements provides for a simple but highly effective holding and mounting arrangement which has proven itself in actual use in waste water settling containers and in flowing bodies of water.

The invention will be described below on the basis of the accompanying schematic drawings showing a particular embodiment of the invention.

BRIEF DESCRIPTION OF THE DRAWINGS

FIG. 2 is a side view of the apparatus shown in FIG. 1, FIG. 3 shows a draining bolt of which two are used for each stack of filter elements, FIG. 4 is a side view of the draining bolt as shown in FIG. 3, but turned about its axis by 90°, FIG. 5 is a cross-sectional view taken along line V—V of FIG. 4.

DESCRIPTION OF A PREFERRED EMBODIMENT

Figure 1:
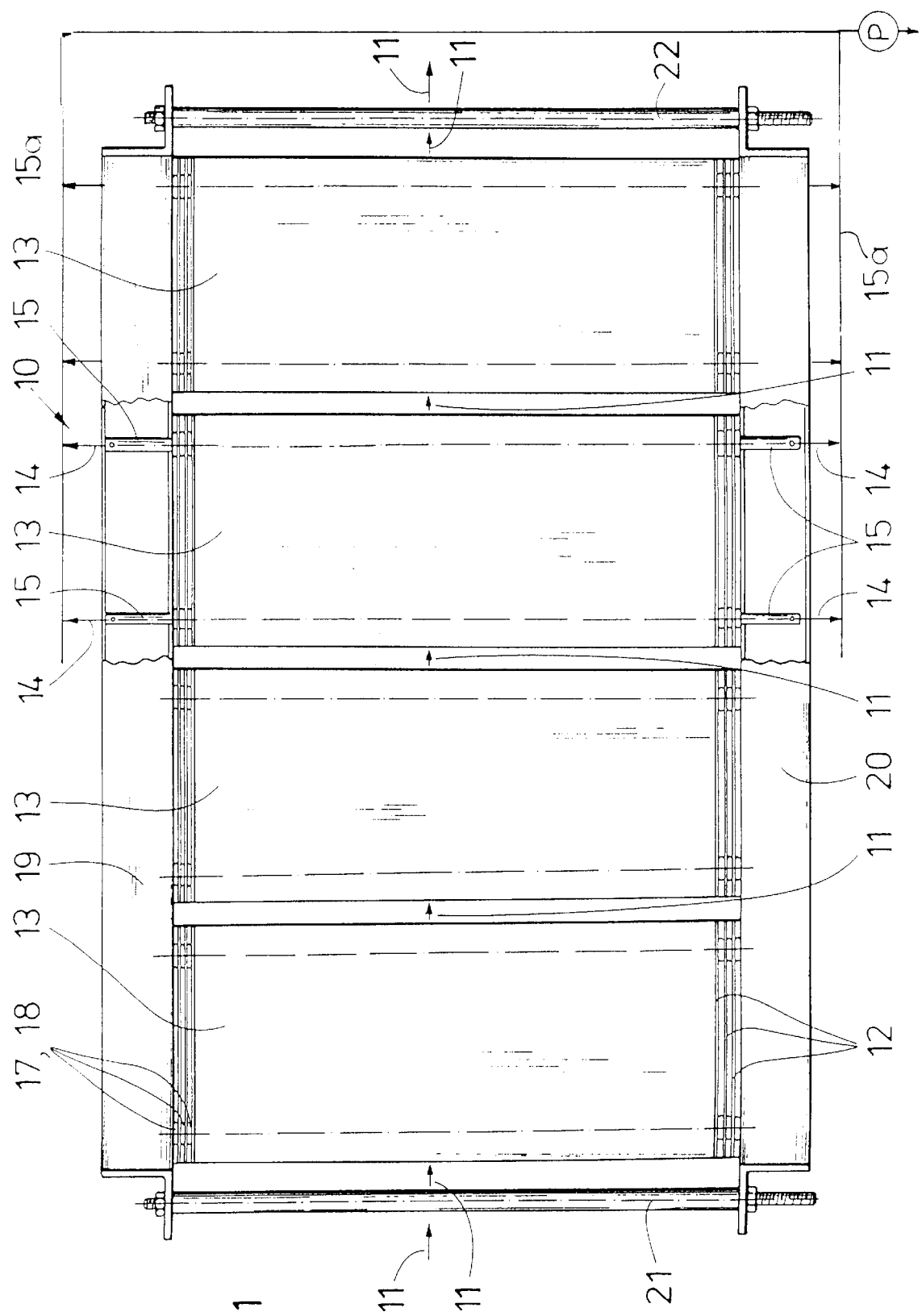
FIG. 1 shows, in a partially sectional view, an apparatus comprising four stacks of filter elements.

First reference is made to FIG. 1, which is a front view of the apparatus 10, and to FIG. 2, which is a side view of the apparatus 10. The apparatus 10 is adapted to filter and separate fluids 11, particularly fluids with high bio-mass concentrations such as 45 g/l. The apparatus 10 includes in the example of FIG. 1 four stacks 13 of filter elements 12, which, in the present case, are in the form of membrane pillows (see FIGS. 6–8). The number of filter elements 12 in each stack 13 is determined by the membrane surface area desired to be included in a stack.

In the embodiment of the apparatus 10 presented here, each stack 13 of filter elements 12 is traversed by two draining rods or bolts 15 as they are shown in FIGS. 3, 4 and 5 in an enlarged fashion with respect to FIG. 1. It is pointed out that the filter elements 12 or, respectively, stacks 13 may include only one draining bolt 15 although two are shown for the particular design. But also more than two draining bolts may be provided in each stack 13 or filter element 12 if, for example, because of the low operating pressure, it is to be ensured that the permeate 14 is safely discharged from the filter elements 12, as will be explained later.

The number of filter elements 12 which form a stack 13 may change from stack to stack of the apparatus 10 if, for example, different spacer elements 17 are used for a stack 13. Such an arrangement may for example be reasonable if the fluid 11 flows, as shown in FIG. 1, from the left to the right through the apparatus 10 so that the spacing of the filter elements increases from stack to stack that is, in the representation of FIG. 1, from the left to the right. The spacing between the filter elements 12 as provided by the spacer elements 17 may vary in a range of 1 to 10 mm. The spacing is selected depending on different bio-mass concentrations or other contamination concentrations in the fluid 11 or, as in the example of FIG. 1, depending on the increase of the concentration of the fluid 11 from the left to the right.

The fluid 11 flows along the filter elements 12 combined in the stacks 13. If the filter elements 12 are in the form of membrane pillows the separation effectiveness of the filter elements 12, when compared with the separation effectiveness of filter elements 12 with a single membrane element 120, is essentially doubled since both sides of the filter element 12 have membranes which are exposed to the fluid 11. As shown in FIGS. 1 and 2, the stacks 13 may be arranged side-by-side so that the fluid 11 can flow uniformly over the surfaces of the filter elements 12. However, the stacks 13 may also be arranged in series and, in addition in a side-by-side relationship. The apparatus 10 accordingly may include a column and/or row-like arrangement of the stacks 13 of filter elements 12. As a result, the configuration of the apparatus can easily be adapted to the type of fluid or, respectively, the degree of concentration of contamination in the fluid.

The stacks 13 of filter elements 12 are engaged at opposite sides by struts 19, 20 of T- or L-shaped cross-section. The struts 19, 20 are held together by spacer rods 21, 22, which have opposite threaded end portions. The length of the spacer rods 21, 22 depends on the number of filter elements 12 in each stack 13, the thickness of the spacer elements 17 arranged between the filter elements and the thickness of the filter elements 12.

Figure 6:
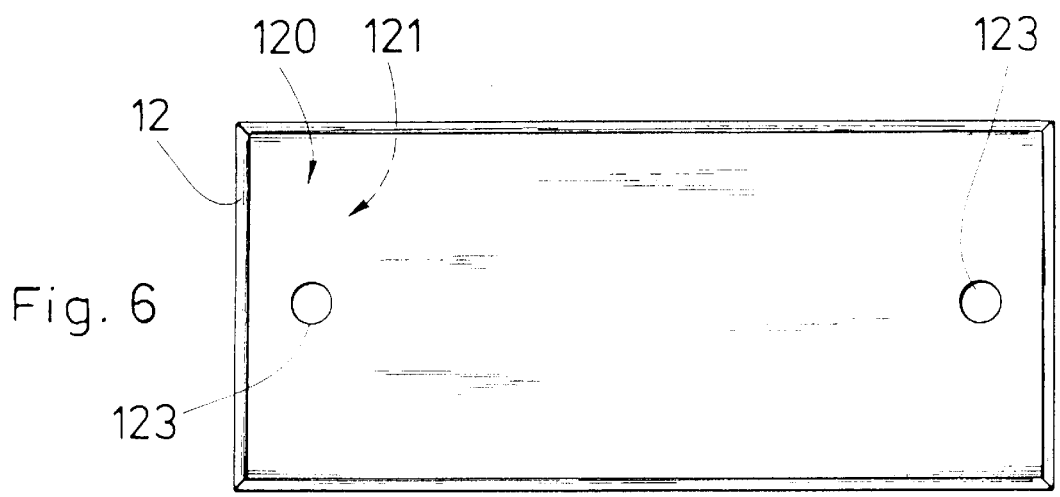
FIG. 6 is a top view of a membrane pillow filter element as used in the apparatus.
Figure 7:
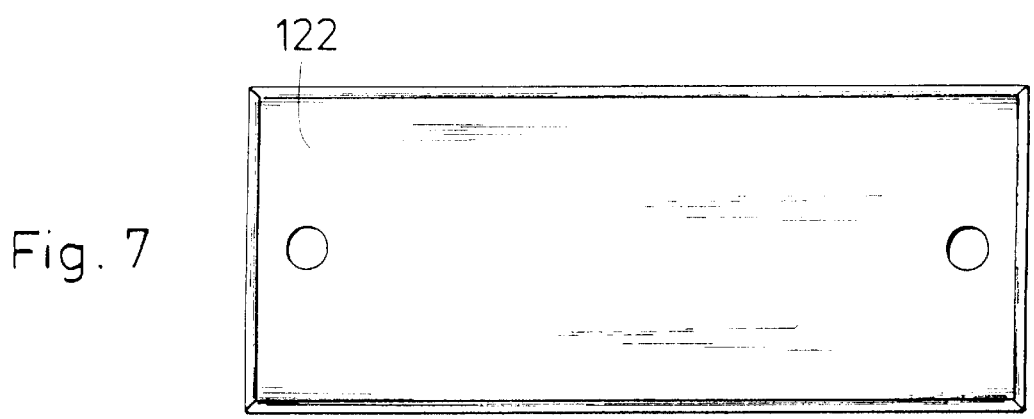
FIG. 7 is a top view of a stabilizing element, which is disposed in the membrane pillow filter element of FIG. 6 between the outer membrane elements.
Figure 8:
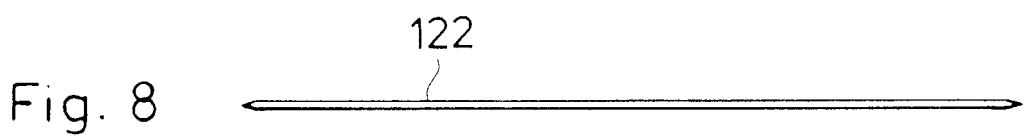
FIG. 8 is a side view of the stabilizing element shown in FIG. 7.

The draining bolt 15 is shown in various views in FIGS. 3–5. In the draining bolt 15, the permeate 14 from the filter elements 12 is collected and conducted to the outside, see also FIG. 1. The draining bolt 15 is adapted to filter elements 12 in the form of membrane pillows as they are shown in FIGS. 6–8. A draining bolts 15 consist essentially of tubes, as they are available commercially as unfinished products. Distributed over each circumference, each draining bolt is provided with draining grooves 152, in this case, with four draining grooves which are formed into the wall but do not extend through the wall of the bolt tube. The draining bolt includes a number of through bores 150 which are distributed over the length and the circumference of the bolt 15 and through which the permeate 14 can flow to the discharge opening 151 of the draining bolt 15. The number of through bores 150 and the number of draining grooves 152 in each draining bolt 15 can be suitably selected depending on the length of the draining bolt 15, its diameter and also depending on the permeate 14.

The draining bolts 15 extend out of the stacks 13 and are in communication, by way of a communication line 15a, with vacuum generating means P, which is a vacuum pump, for generating the pressure differential across the membrane.

The construction of the filter elements 12 in form of membrane pillows is known in the art. In the special arrangement 10 according to the present invention at least one planar form-stable stabilization element 122 is disposed between every two membrane elements 120, 121, see also FIGS. 7 and 8. With the form-stable stabilizing element 122, the membrane pillows can be made very stable. In this way, it can be made sure that adjacent pillow membranes do not come into contact with each other during operation of the apparatus 10. The stabilizing element 122 may be of plastic and/or a metallic material and/or a ceramic material. It may be homogeneous or porous. In this last case uninhibited draining of the permeate is ensured while a vacuum is applied.

Figure 9:
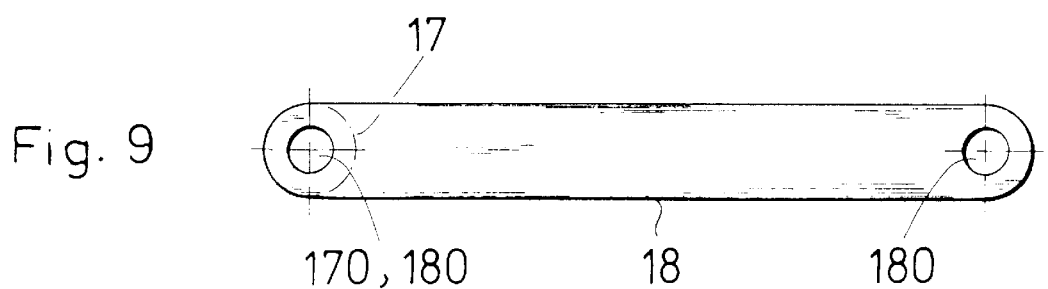
FIG. 9 is a top view of a strip-like spacer element including an annular spacer element shown by dash-dotted lines.
Figure 10:
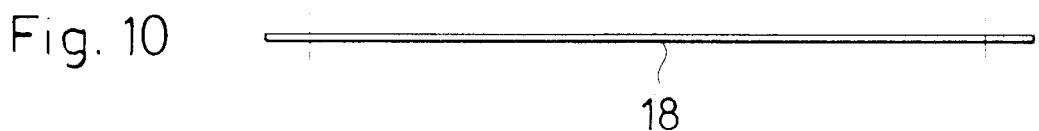
FIG. 10 is a side view of the spacer element shown in FIG. 9.

The filter elements 12 are formed by annular and/or strip-like spacer elements 17, 18, see FIGS. 9 and 10. The spacer elements 17, 18 include bores 170, 180, wherein the bores 180 are so spaced from one another as to correspond to the distance between the openings of the filter elements 12 in the form of membrane pillows which form the permeate discharge openings 123. The spacer elements 17, 18 may, at the same time, act as seal structures if they consist of an elastomer material. The permeate 14 generated in the filter element 12, which is here in the form of a membrane pillow, will flow within the membrane elements 120, 121 to the permeate discharge openings 123 and from there to the drain grooves 152 of the permeate draining bolt 15 extending through the permeate discharge openings 123 and the spacer elements 17, 18. From the draining grooves 152, the permeate 14 flows through the opening 150 of the draining bolt 15 into the draining bolt passage 151 and is discharged to the outside.

During operation of the apparatus 10, which may be immersed into a settling tank, an open body of water or a bio-reactor, the fluid 11 is, after immersion of the apparatus 10, in contact with all the filter elements 12. The permeate discharge openings 16. are connected to suitable conduits to which a vacuum pump is connected which generates a vacuum with respect to the ambient atmospheric pressure at which the fluid is maintained. The vacuum is in the range of 0.5–0.9 bar. The vacuum provides for the separation of the fluid 11 at the filter element 12 such that a permeate 14 is generated which enters the filter element 12 and flows through the interior of the membrane-pillow type filter element 12 to the draining grooves 152 of the draining bolt 15 and from there through the openings 150 in the draining bolt 15 and then to the outside of the apparatus. For the operation of the apparatus 10 in accordance with the invention only a vacuum pump for generating a small vacuum at the permeate side of the filter element 12 or, respectively, the membrane pillow is needed.

Tests with the apparatus 10 indicate that, under certain circumstances, deposits of contaminants contained in the fluid are being formed on the filter elements 12 during operation of the apparatus 10. It has been found however that, because of the relatively small vacuum on the permeate side with respect to the fluid which is essentially at ambient pressure and the small flow speed of the fluid, the deposits on the filter elements 12 have a mechanical consistency which is different from deposits on filter elements in apparatus which are operated at high differential pressures and at high fluid speeds (high feed pressure and high feed speed). These deposit layers are only loosely deposited and can be easily removed by occasional back-washing wherein pure water is admitted to the permeate side of the filter elements 12. The deposits then come loose from the filter element 12 and are carried away by the fluid 12.

The operation of the apparatus 10 can be further improved by blowing air into the fluid to provide for turbulence and, if desired, by providing a circulating pump for moving the fluid past the surfaces of the filter elements 120, 121. This also counteracts the formation of deposits on the filter elements 12.

| LISTING OF REFERENCE NUMERALS | |
|---|---|
| 10 | Apparatus |
| 11 | Fluid |
| 12 | Filter element, membrane pillow |
| 120 | Membrane element |
| 121 | Membrane element |
| 122 | Stabilizing element |
| 123 | Permeate discharge opening |
| 13 | Stack of filter elements |
| 14 | Permeate |
| 15 | Draining bolt |
| 150 | Opening |
| 151 | Draining passage |
| 152 | Draining groove |
| 16 | Permeate discharge |
| 17 | Spacer element (annular) |
| 170 | Bore |
| 18 | Spacer element (strip-like) |
| 180 | Bore |
| 19 | Strut |
| 20 | Strut |
| 21 | Spacer rod |
| 22 | Spacer rod |

What is claimed is:

1. An apparatus for filtering and separating a fluid by reverse osmosis as well as micro-, ultra-, and nano filtration, comprising: at least one stack of spaced planar filter elements having opposite-spaced membranes with outer surfaces to be contacted by said fluid for the collection of permeate from said fluid within said filter elements, each filter element including a planar form-stable stabilization element consisting of a porous material disposed between said opposite membranes and extending internally within the circumference of the membrane element for providing internal stability to the membrane element and permitting passage of permeate, at least one draining rod extending through each stack of filter elements and the stabilization elements, said draining rod being tubular and having, in each filter element, an opening for collecting permeate from the respective filter element, and being in communication with a permeate discharge, and vacuum generating means in communication with each draining rod for generating a vacuum in said filter elements thereby providing a pressure differential between the interior of said filter elements and their outer surfaces which are in contact with said fluid for causing part of said fluid to permeate into said filter elements from where said permeate is drained.

2. An apparatus according to claim 1, wherein said vacuum generating means providing said pressure differential is a vacuum pump which is connected to said permeate discharge.

3. An apparatus according to claim 2, wherein the vacuum generated by said vacuum pump in said filter elements is in the range of 0.4 to 0.9 bar.

4. An apparatus according to claim 1, wherein said filter elements are in the form of membrane pillows.

5. An apparatus according to claim 1, wherein said filter elements consist of a polymer or a polymer mixture.

6. An apparatus according to claim 1, wherein said filter elements consist of a ceramic material.

7. An apparatus according to claim 1, wherein said stabilization element consists of at least one of a plastic, metallic, and ceramic material.

8. An apparatus according to claim 1, wherein said draining rod includes an axial draining passage and, distributed over its circumference and its length, a plurality of openings leading to said draining passage for draining the permeate from said filter elements.

9. An apparatus according to claim 1, wherein, in each stack of filter elements, the filter elements are supported in spaced relationship so that the membranes of adjacent filter elements do not contact one another.

10. An apparatus according to claim 5, wherein annular spacer elements are disposed between adjacent filter elements for supporting said filter elements in spaced relationship.

11. An apparatus according to claim 5, wherein strip-like spacer elements are disposed between adjacent filter elements for supporting said filter elements in spaced relationship.

12. An apparatus according to claim 5, wherein said filter elements are supported in spaced relationship by spacer elements which, at the same time, form seals sealing the permeate spaces between adjacent filter elements.

13. An apparatus according to claim 1, wherein said stack of filter elements is held together by struts extending in spaced relationship at opposite ends of said stacks.

14. An apparatus according to claim 13, wherein said struts are interconnected by spacer rods extending at opposite sides of said stacks of filter elements.

* * * * *